March 27, 1951     D. WILLISON     2,546,485
DRAFT RIGGING
Filed Oct. 25, 1946     2 Sheets-Sheet 1
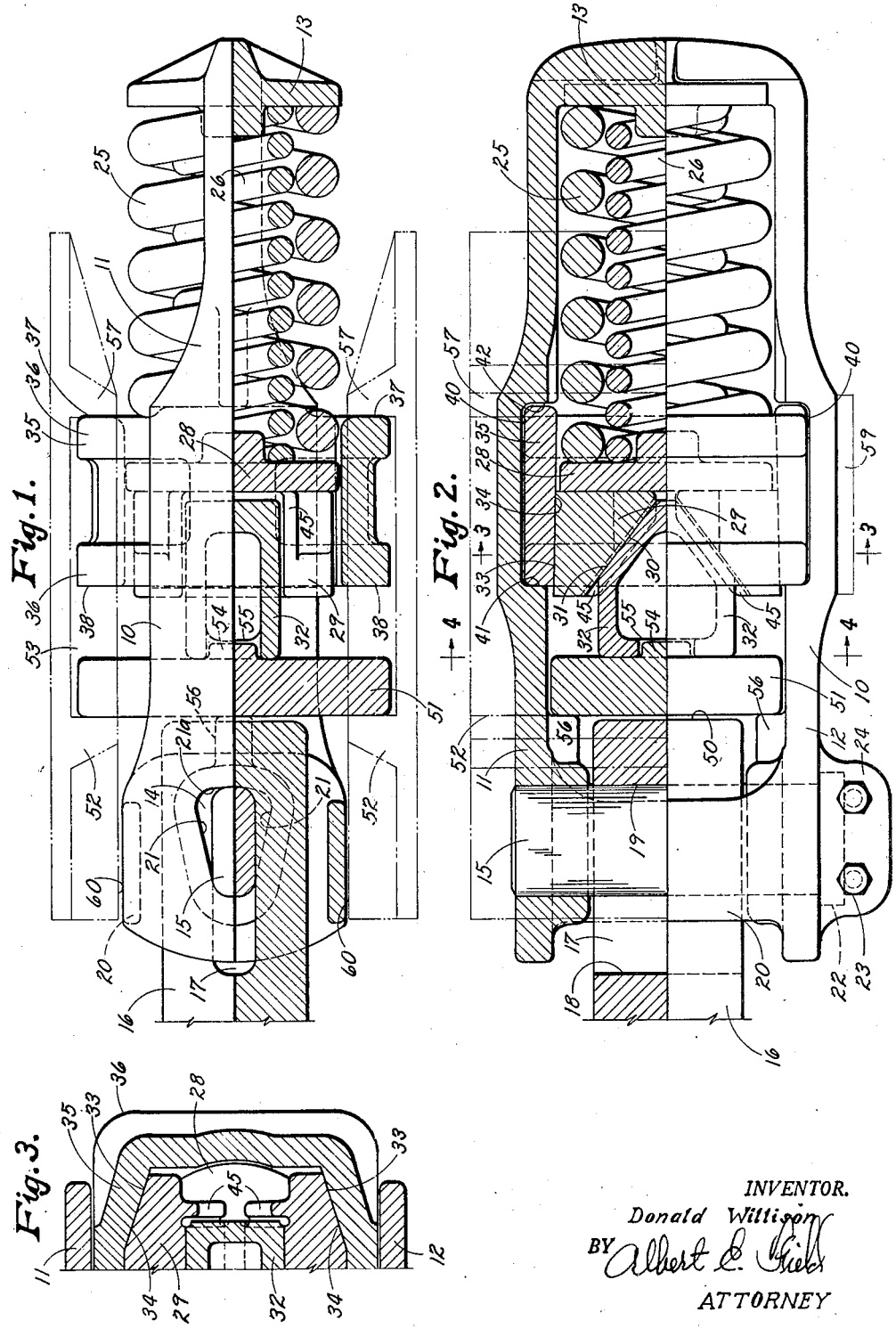
INVENTOR.
Donald Willison
BY Albert E. Fields
ATTORNEY

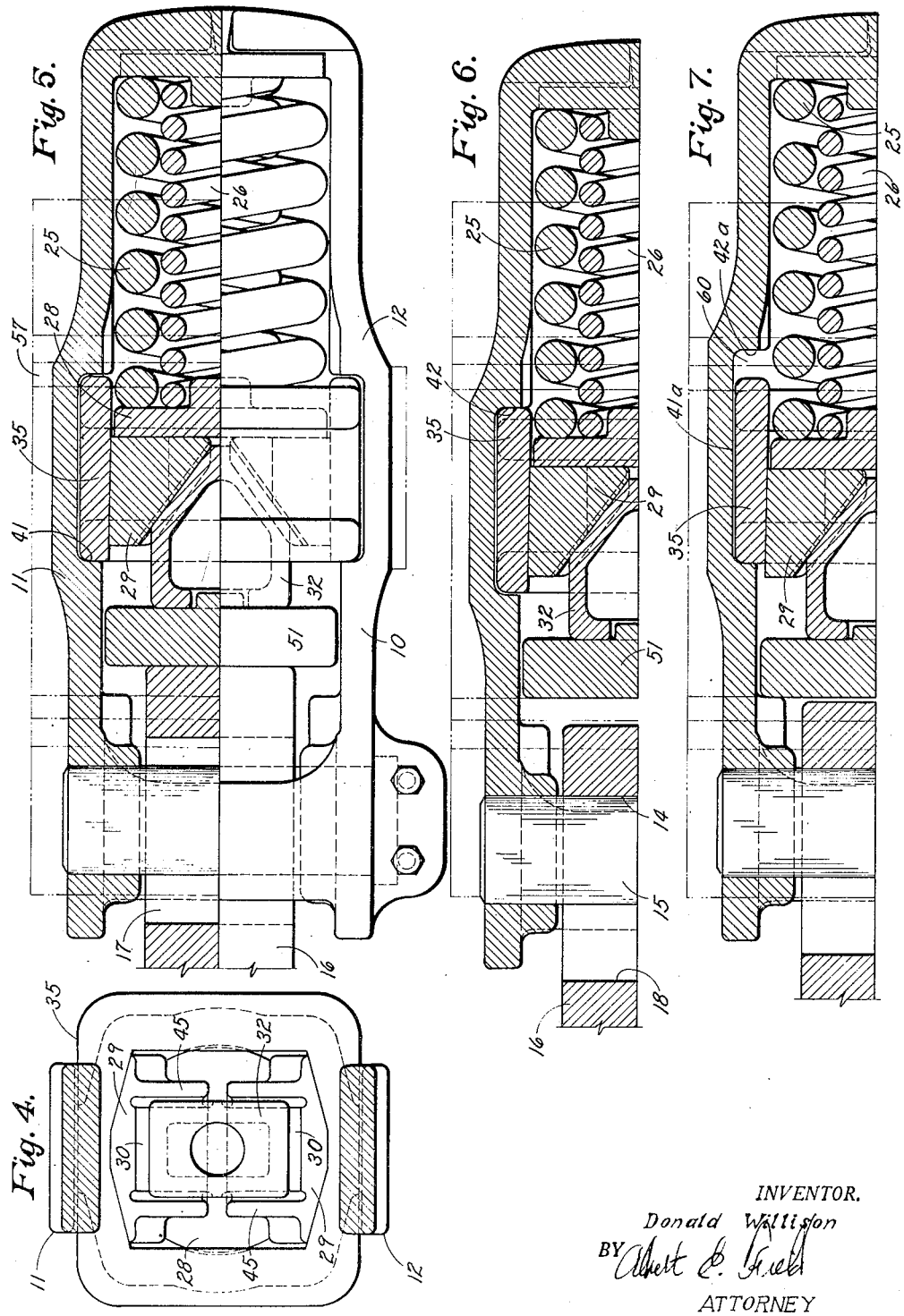

Patented Mar. 27, 1951

2,546,485

UNITED STATES PATENT OFFICE 2,546,485

DRAFT RIGGING

Donald Willison, Shaker Heights, Ohio, assignor to National Malleable and Steel Castings Company, Cleveland, Ohio, a corporation of Ohio Application October 25, 1946, Serial No. 705,556

9 Claims. (Cl. 213—67)

This invention relates to draft rigging for railway cars and more particularly to a combination draft gear and yoke.

An object of my invention is to provide a friction shock absorbing mechanism having a yoke as a component part thereof.

Another object of my invention is to provide a combination yoke and draft gear which is simple, effective and light in weight.

A further object of my invention is to provide a novel yoke for carrying an associated friction shock absorbing mechanism.

A more specific object of my invention is to provide a friction shock absorbing mechanism comprising a friction band, friction shoes in slidable engagement with the band, a wedge member for actuating the shoes and a spring resistance, the friction band being anchored within a yoke member containing the entire mechanism and adapted for operative connection with a car coupler.

Other objects and advantages of my invention will be clear from the following description taken in conjunction with the drawings in which:

Fig. 1 is a plan view partly in longitudinal, horizontal section of an embodiment of the invention.

Fig. 2 is an elevational view partly in longitudinal, vertical section of the mechanism shown in Fig. 1.

Fig. 3 is a transverse vertical sectional view taken on line 3—3 of Fig. 2.

Fig. 4 is a transverse elevational view partly in section, taken along line 4—4 of Fig. 2.

Fig. 5 is a view corresponding to Fig. 2 but showing the mechanism actuated by a force in buff.

Fig. 6 is a partial longitudinal, vertical sectional view showing the mechanism actuated by a force in draft.

Fig. 7 is a partial longitudinal sectional view of a modification of the invention.

Referring to the drawings there is shown a yoke 10 having upper and lower horizontal arms 11 and 12, respectively, joined at the rear ends thereof by a vertical abutment wall 13. The arms at their forward ends are provided with aligned tapered openings 14 for receiving a pin or key 15 connecting the yoke with the coupler shank 16. Slot 17 in the coupler shank for receiving pin 15 is of such length that when the mechanism is buffed the full extent of its travel, a clearance will remain between front end surface 18 of the slot and key 15. With neither a draft or buffing force applied to the mechanism the coupler shank is positioned so that end surface 19 of slot 17 contacts pin 15 or a slight clearance exists therebetween. At the forward end of the yoke, arms 11 and 12 are widened adjacent and parallel to guides 60 on the car sills and are joined by vertical webs 20 which are formed flush with the sides thereof and serve to strengthen the yoke. In the event transverse forces are transmitted to the yoke by the coupler, as occurs in service during movement along curves, the yoke will be maintained in proper operative position by engagement of the forward end thereof with guides 60 (shown in dot-dash). The tapering sides 21 of openings 14 diverge rearwardly and are joined by a curved rear surface 21a, thus permitting movement of key 15 therein to enable horizontal angling of the coupler shank. Key 15 is retained in the yoke by means of a flange or collar 22 in conjunction with supporting bolts 23 extending through lugs 24 on the underside of yoke arm 12.

Within the yoke in engagement with abutment 13 are the main spring 25 and an inner spring 26 of the shock absorbing mechanism. Associated with the other end of the springs is a plate or follower 28 against which a pair of friction shoes 29 bear. Shoes 29 are provided on their inner sides with sloping surfaces 30 for engagement with correspondingly sloped surfaces 31 on wedge member 32. The outer sides of the shoes are provided with surfaces 33 for frictional engagement with the inner surfaces 34 of band or housing 35 which encloses the shoes. The shoes are slidably associated with band 35 in a direction lengthwise of the mechanism and are adapted to be urged by wedge 32 laterally into increasing frictional engagement with the band as springs 25 and 26 are compressed in buff or in draft. Friction surfaces 34 of the band converge slightly in a rearward direction so that greater friction is developed as the shoes move rearwardly against the spring resistance, and upon a release of the draft or buffing force the parts will release quickly and return to normal position. Thus it is seen that shocks imparted to the coupler are cushioned by springs 25, 26 and by the friction developed by the wedge, friction shoes and friction band.

The inner sides of yoke arms 11 and 12 are recessed as at 40 for receiving band 35 to anchor it relative to the yoke in a direction longitudinally thereof. The front and rear ends of recesses 40 are formed with abutments or shoulders 41 and 42, respectively, which are adapted to engage the adjacent edges of band 35 to limit movement thereof as aforementioned.

To assure good bearing between friction shoes 29 and band 35, along friction surfaces 33 and 34, these surfaces are disposed in substantially V-shaped planes. Guide flanges 45 are provided on shoes 29 to maintain wedge 32 in correct operative position relative thereto.

Interposed between the end surface 50 of the coupler shank and wedge 32 is the front follower 51 which also normally engages front stops 52 of the draft pocket 53 (shown in dot-dash). Follower 51 has a rearwardly extending projection 54 which protrudes into opening 55 in wedge 32, thus tying together the two members. Follower 51 in normal position of the parts engages abutments 56 on yoke arms 11 and 12, which are so positioned as to place the mechanism under the desired initial compression during assembly thereof.

Band 35 extends into pocket 53 and is normally in engagement with rear stops 57 which limit rearward movement thereof. Peripheral flanges 36 are provided at each end of band 35 for strengthening the member and also for increasing the end bearing surfaces 37 and 38 adapted for engagement with stops 57 and follower 51 respectively.

It will be noted that this arrangement of parts utilizes a draft pocket considerably smaller than that required with conventional draft gears having separate yokes associated therewith. In the latter type the pocket is generally of a length equal to that of the draft gear, whereas the present pocket is considerably shorter than the length of the shock absorbing mechanism.

While a pair of friction shoes have been shown, a greater number may be utilized without departing from the spirit of the invention.

Operation of the unit is as follows: Assuming first that a force in buff is applied (shown in Fig. 5), band 35 and yoke 10 are held stationary by the engagement of shoulder 41 of the yoke with the forward surface of the band, while follower 51, wedge 32, friction shoes 29 and follower 28 all move rearwardly against the resistance of springs 25 and 26. The buffing force is transmitted through the coupler shank 16 to front follower 51 and hence to the friction members and the springs. It will be observed that slot 17 in shank 16 allows unrestricted rearward movement thereof, and this movement continues until follower 51 engages the front end 38 of band 35. The parts are so arranged that springs 25 and 26 are never compressed solid, the travel of the mechanism being limited only by the engagement between follower 51 and band 35. Since the rear portions of arms 11 and 12 need be strong enough to withstand only the compression of the springs, they are of lighter construction than the portion adjacent band 35, thus decreasing the overall weight of the mechanism. Upon release of the buffing force the expansive force of the spring quickly returns the parts to normal position.

When a draft force is applied to the unit (Fig. 6), the yoke pulls the friction band forwardly through engagement of shoulder 42 with the rear end of band 35, key 15 transmitting the pulling force from coupler shank 16 to the yoke. The other parts, namely front follower 51, wedge 32, and friction shoes 29, now remain stationary, but as springs 25 and 26 are compressed, friction shoes 29 are urged with increasing force against wedge 32, resulting in a correspondingly increasing lateral force urging the shoes into frictional engagement with band 35. Movement of the coupler and yoke continues against the frictional and spring resistance until the forward end of band 35 engages follower 51. As in buff springs 25 and 26 do not go solid and the aforesaid engagement between the band and follower limits the travel of the mechanism in draft.

In assembling the unit the yoke 10 is first placed in a vertical position with the forward end elevated. Then band 35 with springs 25 and 26 extending therein is moved laterally as a unit into the yoke, the band sliding into recess 40 and the springs dropping onto abutment 13. Next, follower 28 is placed on the springs, after which shoes 29 and wedge 32 are applied. The springs are then compressed by any suitable means to permit the application of follower 51. Thereafter, the compression of the springs is released and all of the parts are held in assembled relation in the yoke in readiness for the application of the coupler. The unit may now be applied to the car, and after it has been raised to the proper position in which follower 51 and band 35 extend into pocket 53, then support 59 (shown in dot-dash) is secured to the car structure.

In the embodiment shown in Figs. 1 and 2 frictional resistance is present to cushion shocks throughout the travel of the mechanism in both buff and draft. However, at times it may be desirable to have some free spring action during initial travel in draft before any friction is generated between shoes 29 and band 35. This action is provided in the modification shown in Fig. 7 wherein recess 41a in the upper and lower arms of the yoke is extended rearwardly so that a clearance as at 60 exists between friction band 35 and rear abutment 42a of the recess. The operation of the mechanism in draft is such that as the yoke moves forwardly the friction band 35 remains stationary relative to shoes 29 while springs 25 and 26 are being compressed. This free spring action continues until abutments 42a engage band 35, after which the band moves forwardly and friction is generated between the shoes and band, as in the previous embodiment, to oppose further movement of the yoke in draft. In buff the action of the mechanism is the same as before, the friction produced between the band and shoes opposing compression of the springs at the start of movement.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. A combination yoke and friction shock absorbing mechanism for a railway car comprising a yoke, a friction band carried by said yoke and movable relative thereto a predetermined amount in a longitudinal direction, said band having abutments for engagement with buffing stops on a car structure to preclude rearward movement of said band, said yoke having abutments spaced rearwardly of the rearward end of said band and being adapted for engagement with said end of said band upon a predetermined amount of movement of said yoke in draft, friction shoes within said band adapted for longitudinal slidable engagement therewith, spring means in said yoke extending rearwardly of said shoes for opposing relative longitudinal movement between said shoes and band, a wedge for urging said shoes against said band and against the resistance of said springs, a follower engaging said wedge and having lateral portions for engagement with draft stops on a car structure, said spring means maintaining said abutments on said yoke out of contact with the rearward end of said band.

2. A combination yoke and friction shock absorbing mechanism for a railway car comprising a yoke having a pair of spaced arms, said arms having forward and rearward abutments, a friction housing carried by said arms and having its forward end in engagement with said forward abutments, the rearward end of said housing being spaced a predetermined amount forwardly of said rearward abutments, friction shoes within said housing and being in longitudinal slidable engagement therewith, spring means carried by said yoke and extending rearwardly of said shoes for opposing relative longitudinal movement between said shoes and housing, a wedge for urging said shoes against said housing and against the resistance of said spring means, abutments on said arms disposed forwardly of said wedge, and a follower interposed between said wedge and said lugs, said rearward abutments being adapted to move into engagement with the rearward end of said housing upon movement of said yoke in draft, after which said housing and yoke move as a single unit in draft.

3. In a combination yoke and friction shock absorbing mechanism for a railway car, a yoke member having spaced arms adapted for connection to a car coupler, a friction band between said arms, said arms having their inner sides recessed in a transverse direction to provide longitudinally spaced abutments, said band being insertable into said recesses in a transverse direction and engaging said abutments to anchor said band to said arms against movement longitudinally thereof, abutments on said band disposed laterally of said abutments on said arms for engagement with stops on a car structure to limit longitudinal movement of said band in one direction, friction shoes within said band and adapted for longitudinal slidable engagement therewith, spring means carried by said yoke extending rearwardly of said shoes and opposing said slidable movement of said shoes, and a wedge for urging said shoes against said band and against the resistance of said spring means.

4. A friction shock absorbing mechanism comprising a yoke having vertically spaced arms for operatively connecting said mechanism to a car coupler, the inner sides of said arms having transversely extending recesses, a friction housing open at both ends received between said arms and extending into said recesses to anchor said housing to said arms in a direction longitudinally thereof, friction shoes within said housing adapted for longitudinal slidable engagement therewith, spring means in said yoke extending rearwardly of said shoes for opposing relative longitudinal movement between said shoes and housing, a wedge for urging said shoes against said housing and against the resistance of said spring means, stop lugs integral with and extending inwardly of said arms, and a follower interposed between said lugs and wedge, said lugs being so disposed in a direction longitudinally of said arms that said spring means is placed under initial compression to maintain said mechanism in assembled relationship.

5. A draft rigging for railway cars comprising a pair of arms adapted to be connected to a car coupler and extending rearwardly therefrom, spring carrying means extending rearwardly from said arms, a friction housing open at both ends extending between said arms intermediate said coupler connecting portion and said spring carrying means, friction shoes engaging the inner surface of said housing and slidable longitudinally thereof, a spring extending rearwardly of said housing and interposed between said spring carrying means and said shoes, a wedge for urging said shoes against said housing and against the resistance of said spring means, follower means between said wedge and said coupler connecting portion of said arms, said follower having lateral portions for engagement with draft stops on a car structure, and inwardly extending stops on said arms adapted for engagement with the forward side of said follower means, said stops being so disposed in a longitudinal direction as to place said spring under initial compression to maintain said draft rigging in assembled relationship.

6. A combined yoke and friction draft gear comprising a friction housing open at both ends, a pair of yoke arms for transmitting draft forces from a car coupler to said housing, said housing having integral abutments at the sides thereof for engagement with rear stop means on a car structure to prevent rearward movement of said housing in buff, friction shoes engaging the inner surface of said housing and slidable longitudinally thereof, a spring extending rearwardly from said housing and arranged to exert a force against said shoes to resist movement thereof relative to said housing, spring carrying means extending rearwardly from said housing and being separable therefrom, said spring carrying means providing a base of resistance for said spring, a wedge for urging said shoes against said housing and against the resistance of said spring means, and a follower engaging said wedge and having lateral portions for engagement with forward stop means on a car structure to prevent forward movement of said follower in draft.

7. A combined yoke and friction draft gear comprising a friction housing, friction shoes within said housing and slidable longitudinally thereof, a wedge for actuating said shoes, a follower interlocked with said wedge and serving to transmit buffing forces to said wedge and shoes, said follower being adapted for engagement with draft stops in a car structure to transmit draft forces thereto, spring means for opposing longitudinal movement of said shoes relative to said housing, arms extending rearwardly from said housing and being detachable therefrom, said arms forming an abutment for said spring means, arms extending forwardly from said housing for operative connection to a car coupler, integral abutments at the sides of said housing for engagement with buffing stops in a car structure to prevent rearward movement of said housing and arms when a force in buff is applied to said gear, and inwardly extending abutments on said forwardly extending arms for engaging said follower, said stops being so disposed in a longitudinal direction as to place said spring means under initial compression to maintain said yoke and gear in assembled relationship.

8. A combination yoke and friction shock absorbing mechanism for a railway car comprising a yoke having coupler attaching means at one end thereof and spring retaining means at the other end, said yoke having a friction housing intermediate the ends thereof, said housing being open at both ends, and being secured to said yoke for movement therewith in a longitudinal direction, friction shoes within said housing, a wedge for urging said friction shoes into frictional contact with said housing and moving them longitudinally thereof, integral abutments on said yoke adjacent said coupler attaching means, a follower between said wedge and said abutments, a spring between said spring retaining means and said friction shoes urging said follower into contact with said abutments to maintain assembly of said friction shock absorbing mechanism, and integral abutments at the sides of said housing for engagement with stop lugs on a car structure to prevent rearward movement of said housing and yoke in buff.

9. A combination yoke and friction shock absorbing mechanism for a railway car comprising a yoke having coupler attaching means at one end thereof and spring retaining means at the other end, said yoke having a friction housing intermediate the ends thereof, said housing being open at both ends, friction shoes within said housing, a wedge for urging said friction shoes into frictional contact with said housing and moving them longitudinally thereof, integral abutments on said yoke adjacent said coupler attaching means, a follower between said wedge and said abutments, a spring between said spring retaining means and said friction shoes urging said follower into contact with said abutments to maintain assembly of said friction shock absorbing mechanism, said follower extending laterally beyond the confines of said yoke member for engagement with draft stops on a car structure, and integral abutments at the sides of said housing for engagement with buffing stops on a car structure to prevent rearward movement of said housing in buff.

DONALD WILLISON.

REFERENCES CITED

The following references are of record in the file of this patent:

UNITED STATES PATENTS

| Number | Name | Date |
|---|---|---|
| 1,765,875 | O'Connor | Jan. 24, 1930 |
| 1,800,549 | Lounsbury | Apr. 14, 1931 |